R. C. PATTON.
MOTOR STARTING SWITCH.
APPLICATION FILED AUG. 5, 1914.
1,232,599.
Patented July 10, 1917.
3 SHEETS—SHEET 3.
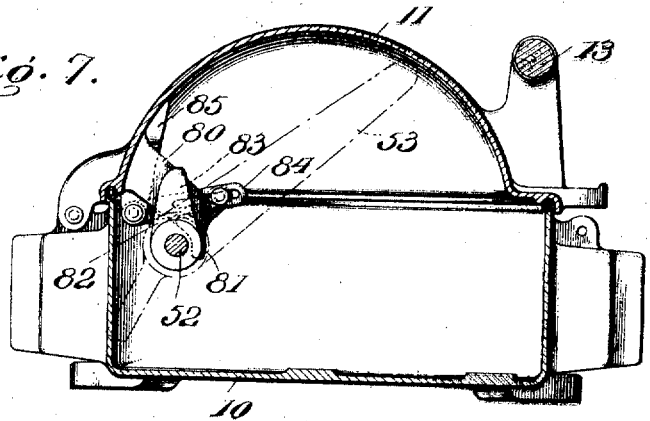
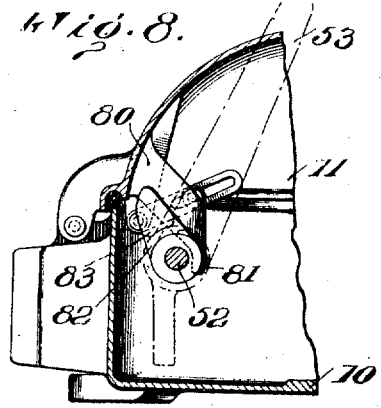
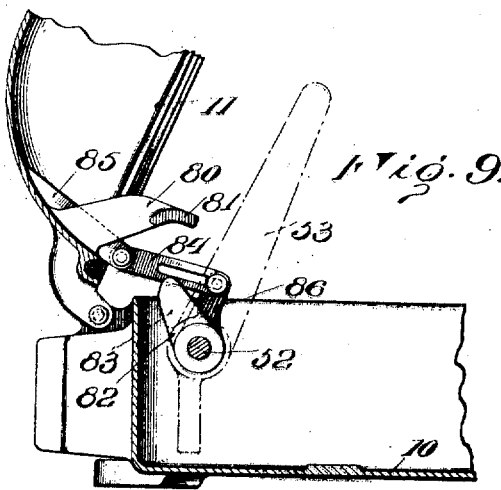
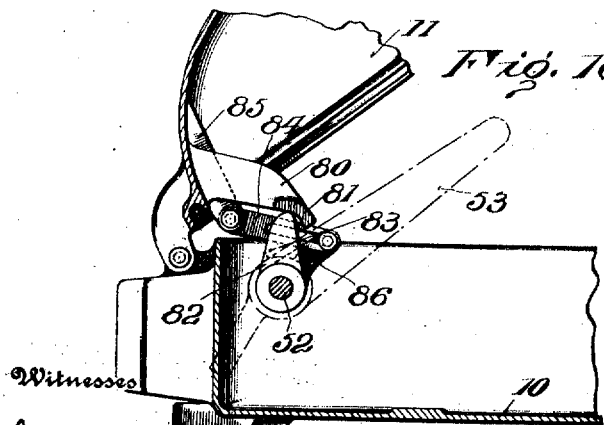
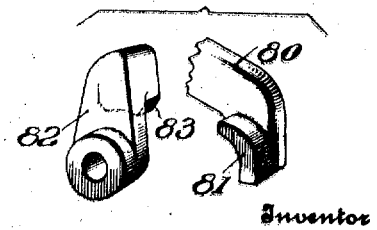
Witnesses
J. B. Wegenast.
Ed. Mueller.
Inventor
Ralph C. Patton.
by
Mauro, Cameron, Lewis &
Massie
Attorneys

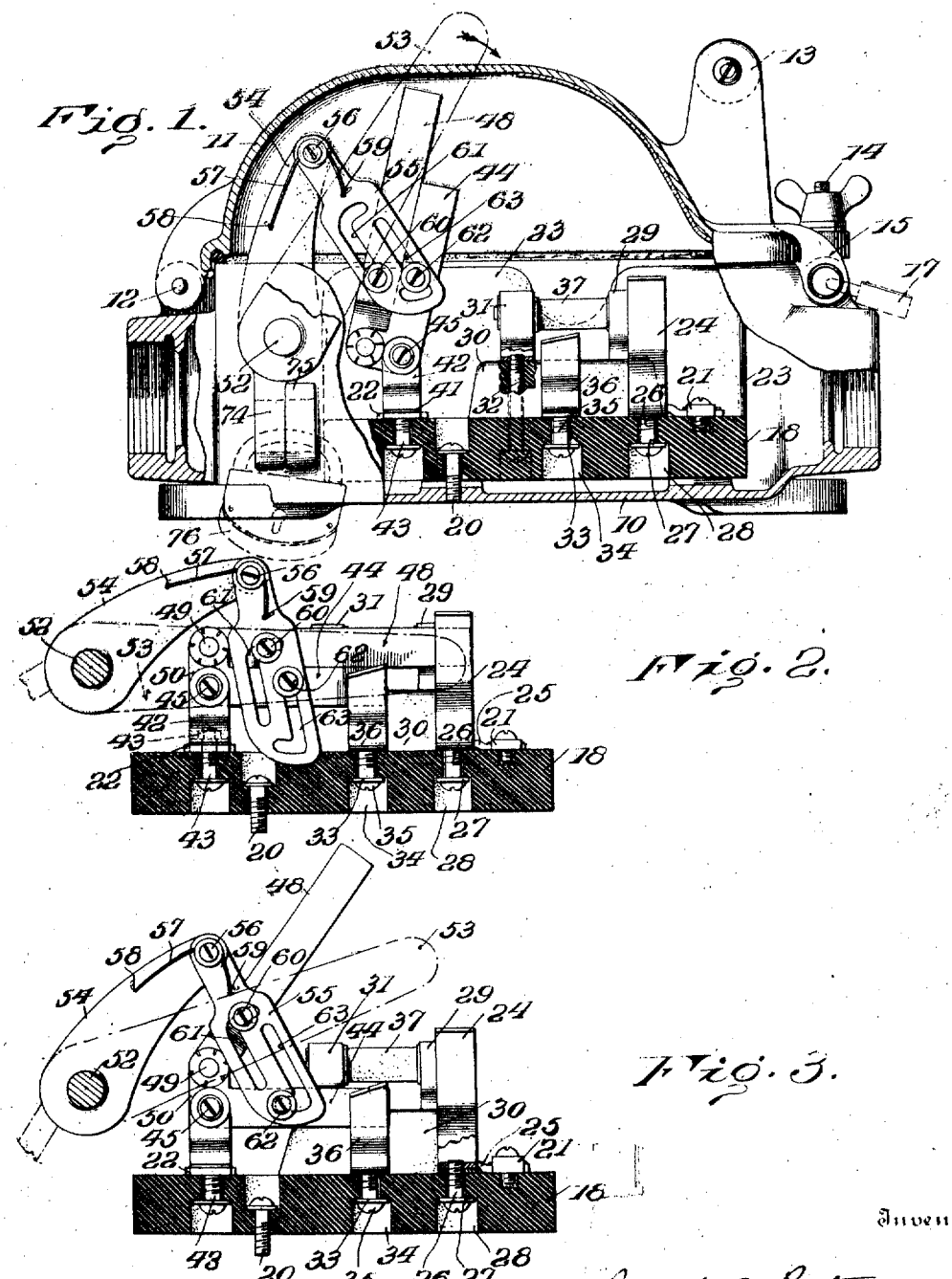

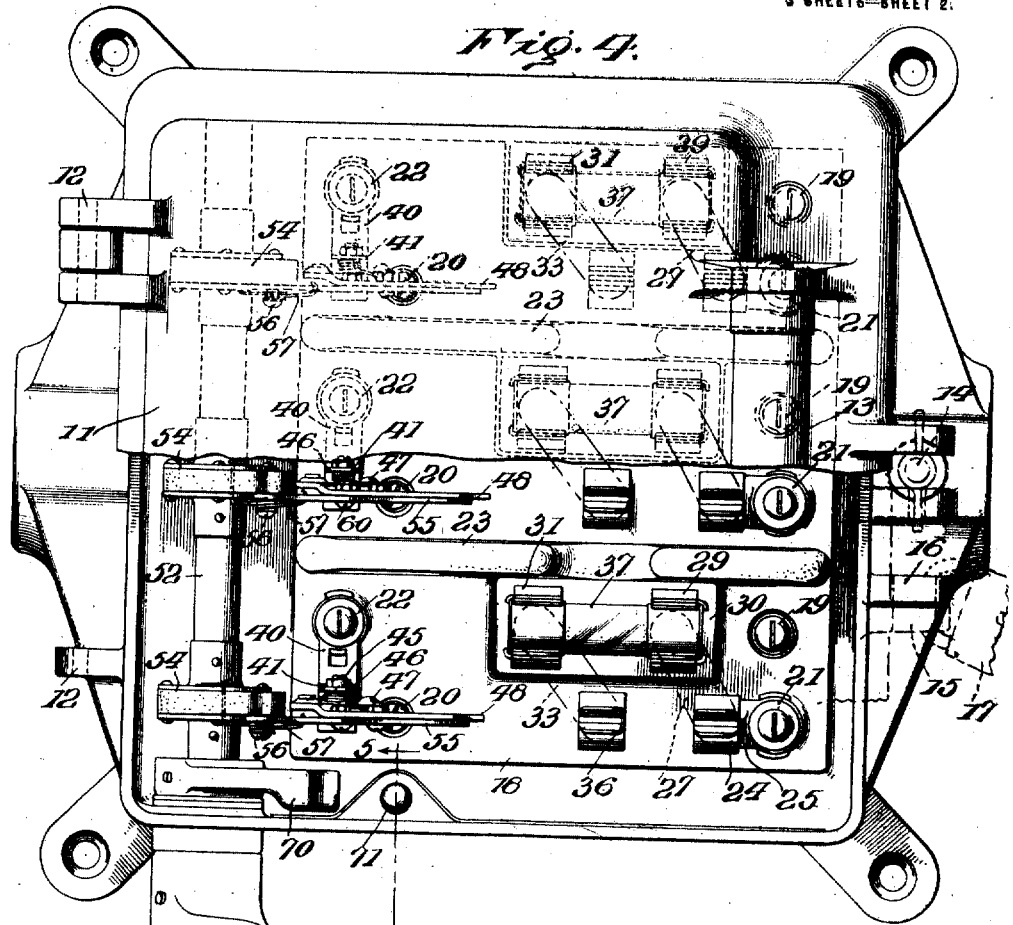

UNITED STATES PATENT OFFICE.

RALPH C. PATTON, OF PROVIDENCE, RHODE ISLAND, ASSIGNOR TO D & W FUSE COMPANY, OF PROVIDENCE, RHODE ISLAND, A CORPORATION OF RHODE ISLAND.

MOTOR-STARTING SWITCH.

1,232,599.   Specification of Letters Patent.   Patented July 10, 1917.

Application filed August 5, 1914.   Serial No. 855,227.

*To all whom it may concern:*

Be it known that I, RALPH C. PATTON, a citizen of the United States of America, and resident of Providence, Rhode Island, have invented a new and useful Improvement in Motor-Starting Switches, which invention is fully set forth in the following specification.

This invention relates to starting switches designed for use in connection with electric motors and in association with an electric fuse to be included in the energizing circuit of the motor for its protection under normal operating conditions.

To afford proper protection to the motor running under its normal load, the maximum current-carrying capacity of a fuse included in the motor energizing circuit cannot greatly exceed the maximum current normally required to operate the motor. But to start the motor from a condition of rest, the amount of current delivered to the motor must be much larger than that required for normal running conditions, in certain classes of motors from three to four and in some instances five times as large. Yet that abnormal amount of current delivered through a fuse such as to afford protection to the motor under normal running conditions would immediately disrupt or blow the fuse. On the other hand, if the fuse is of such capacity as to carry the abnormal starting current, it would not afford proper protection under normal running conditions. Electric motors, especially of the type for which the starting switch of this invention is designed, are capable of withstanding without injury for a brief period the abnormal or overload current required to start the motor from a state of rest. But should such abnormal current be continued for a considerable period, the heat generated would burn out the insulation of the motor with consequent injury or destruction. It is because of this danger that, under normal running conditions, the energizing circuit provided is made to include fuses of a maximum capacity reasonably near the continuous full-load current capacity of the motor.

Generally, the object of the present invention is to provide a switch for controlling motor circuits adapted to establish an initial or motor-starting circuit which will permit current to pass to the motor without traversing the protecting fuses and thereupon, with the motor started, to pass the entire normal running current through said protecting fuses connected in the circuit in series. This and other more specific objects are realized by my present invention which may best be more fully explained by reference to the accompanying drawings illustrating what I at present regard as the best known mechanical expression thereof. In said drawings, Figure 1 is a longitudinal vertical section through an inclosed switch structure embodying the invention;

Fig. 2 is a similar view (omitting the inclosing casing) showing all switch-blades in their closed position;

Fig. 3 is a view similar to Fig. 2, with the short switch-blades in the closed position and the long switch-blades in the corresponding open position;

Fig. 4 is a top plan view—on a larger scale than Figs. 1-3—with half of the cover broken away, of a complete inclosed switch structure adapted for use with a three-wire circuit, and the operating handle in its up-position, the same as shown in Fig. 1;

Fig. 5 is a sectional detail, on the line 5—5 of Fig. 4, with parts in elevation, and the operating handle in its down-position, the same as shown in Fig. 2;

Fig. 6 is a detail perspective view, showing the two switch-blades and their associated actuating parts in their relative positions assumed when the operating handle is being actuated in moving both switch blades downward into engagement with their spring-jaw circuit terminals;

Figs. 7 to 10 are vertical sectional views (some fragmentary) illustrative of the action of means which prevent opening or closing of the cover of the casing with the switch in a closed position, and which also prevent the closing of the switch with the cover open and the simultaneous closing of both switch and cover; and Fig. 11 is a detail perspective of parts shown in Figs. 7 to 10.

10 is a casing or box having a dome-like cover 11 hinged at 12, 12, and provided with a handle 13. The cover is clamped and held to its closed position by the usual form of swinging bolt 14 having a wing nut. A lug 15 on the cover depends, in the closed position of the cover, into juxtaposition to a lug 16 on the box, permitting a padlock 17 to engage through registering openings to lock the cover closed. Openings through the end walls of the box 10 admit the incoming and outgoing circuit wires. The particular structure illustrated in the drawings is one adapted to a three-wire circuit, with three sets of switch mechanisms operated from a common shaft, terminals for three fuses, etc. Changes appropriate to adaptation of the apparatus to two-wire and other forms of circuit will be obvious.

A base block 18 of dielectric material, such as porcelain, is mounted in the box and secured to the bottom thereof by three screws 19 at one end and three screws 20 at the other end. The three wires leading into one end of the box are secured to three terminals 21, 21, 21, respectively, mounted on one end of the block 18; and the three circuit wires entering the other end of the box are joined to three terminals 22, 22, 22, respectively, mounted on the other end of the block 18. Two parallel partitions or insulating barriers 23 (illustration of which is omitted in Figs. 2 and 3), preferably formed integrally with the block 18, rise vertically therefrom dividing the upper surface of the block into three equal portions, having associated therewith, respectively, the three sets of terminals (21, 22) of the three circuit wires, and the three parts of the three-part switching mechanism. Inasmuch as these three sets of parts are the same for the respective wires, a description of one will suffice. Terminal 21 is electrically connected to a switch terminal jaw 24 by an extension piece 25 (Fig. 3), these parts being secured in place by a screw 26 passing upward through the base block. Screw 26 passes through the end of a conducting strip 27 lying in a groove or recess 28 in the under face of the block 18. A similar screw (like 26), passing upward through the other end of strip 27 and through the block 18, makes electrical connection to a spring-jaw fuse-terminal 29 and also secures the same in place at the upper surface of an elevated portion 30 on the upper face of the block 18. A similar fuse-terminal 31 is secured in place at the other end of the elevated portion 30 by a similar screw 32 (Fig. 1) which passes upward through one end of a conducting strip 33 lying in a groove 34 on the under surface of the block 18. A screw 35 passing upward through the other end of the strip 33 extends the electrical connection to a switch-blade terminal jaw 36 and secures the latter to the base block. 37 is an electric fuse, of the well-known inclosed type, held at its opposite ends in the terminals 29 and 31, respectively.

The terminal 22 has an extension strip or plate 40 against the outer end of which is seated the short arm of an L-shaped piece 41, and upon the latter there is seated a U-shaped piece 42; the three parts are securely fastened together by a screw-headed bolt 43 passing upward through block 18.

A short switch-blade 44 is pivoted between the upper ends of the arms (which are bent toward each other) of the U-shaped piece 42 by a screw-headed pivot pin 45 passing through said arms and switch-blade and also through the upper end of the L-shaped piece 41 into a nut at the outer face of the latter. A spring 46 is anchored at one end by hooking through an opening in the upright part of the L-shaped piece 41, coiled around the pin 45 between the U-shaped piece 42 and the L-shaped piece 41, and at its other end is fastened to a stud 47 on the short switch-blade 44 (Fig. 6). As later explained, this spring functions to disengage the short switch-blade from its cooperating jaw terminal 36 with a snap action after disengagement has been partly effected by movement of the switch handle. 48 is a long switch-blade adapted in its closed position (Fig. 2) to engage its jaw terminal 24. It is pivoted by a stud 49 to an upright lug 50 rising from the pivoted end of the short switch-blade 44. At 51 the long switch-blade 48 makes a bend to bring it to a position above the edge of the short switch-blade 44 for the greater part of the length of the latter.

52 is a shaft journaled in bearings in the side walls of the box 10 and extending through one of said walls to the exterior thereof where it carries an operating handle or lever 53. 54 is a switch-acting rocker arm fixed to shaft 52 inside the box, there being one such arm for each switch mechanism. 55 is a link or plate pivoted to the outer end of said arm 54 by a screw-bolt 56. A spring 57 anchored at one end to the rocker arm at 58 is coiled about the screw-bolt 56 and at its other end anchored to the link at 59, this spring constantly tending to swing the link 55 outwardly (away from the shaft 52) on its pivot. A headed stud 60 carried by the long switch-blade 48 works in an inverted L-shaped slot 61 of the link 55; and similarly a headed stud 62 carried by the short switch-blade 44 works in a reverse L-shaped slot 63 of the link 55. The upper short transverse end of slot 61 is at an approximately right, or slightly obtuse angle to the long portion of said slot, whereas the lower short transverse end of slot 63 is at an acute angle to the long portion of said slot. And this is important to the action of these parts which will be explained in the later description of the operation.

The shaft 52 also carries, inside the box, a rocker arm 70 adapted to engage the upper end of a plunger 71 resting against a coiled spring 72, said plunger and spring being housed in a recess 73 bored in an enlargement in the side wall of the box. A perforated lug 74, depending from the end of the operating handle 53 where it embraces the shaft 52, overlaps a similar lug 75 on the box with the operating handle in the open position of the inclosed switch, whereby a padlock, such as 76 (Fig. 1), may be engaged through said lugs to lock the switch in that position.

The operation is as follows:—

Fig. 1 shows the switch open with the operating handle 53 and the long and short switch-blades 48 and 44 standing in an upright position; and, as before stated, the parts may be locked in this position by a padlock such as 76. To close the switch and start a motor connected in the circuit thereof, the operating handle 53 is moved downward—in the direction of the arrow Fig. 1—rotating shaft 52, rocking the arm 54 and moving link 55. The switch-blades 44 and 48 do not participate in the movement until the upper ends of the slots 61 and 63 of the link reach the studs 60 and 62, respectively, as shown in Fig. 6; thereupon the continued downward movement of the link 55 swings both switch-blades downward about the pivot 45 and in opposition to the resistance of spring 46, until the parts reach the position shown in Fig. 2, with the end of the short switch-blade 44 in engagement with the terminal jaw 36; the end of the long switch-blade 48 in engagement with the terminal jaw 24, and the rocker arm 70 bearing against the upper end of the plunger 71 and compressing the spring 72, as shown in Fig. 5. With the parts in this position (Fig. 2), the short switch-blade 44, by its engagement with the jaw terminal 36, establishes a circuit from terminal 22, through switch-blade 44 to spring jaw terminal 36, conductor strip 33, fuse-terminal 31, fuse 37, fuse-terminal 29, conductor strip 27, to terminal 21. At the same time the long switch-blade 48 establishes a shunt or short circuit around the fuse 37 from the terminal 22, long switch-blade 48, jaw terminal 24, extension piece 25, to terminal 21. The operator holds the handle 53 (and incidentally the other parts of the switch) in this position (Fig. 2) against the reacting pressure of the spring 72 and plunger 71, for the brief period of time necessary to start the motor, and thereupon releases his grip upon the operating handle. The spring 72 and plunger 71 immediately automatically operate to rotate the shaft 52 and elevate handle 53 and the long switch-blade 48 to the position shown in Fig. 3, said blade 48 being carried upward by the link 55 because of the engagement at this time of the stud 60 in the upper transverse end of the slot 61. This automatic movement of the parts from the position shown in Fig. 2 to that illustrated in Fig. 3, immediately the operator releases his grip upon the operating handle, is especially important, inasmuch as it eliminates any reliance upon the operator to bring the parts to a position in which the motor is protected by the fuse. A careless operator would simply close the switch to the position shown in Fig. 2 and forget to bring it to the position shown in Fig. 3, after starting the motor, if that duty were imposed upon him instead of being automatically performed as in the structure described.

With the parts in the position shown in Fig. 3, the short or shunt circuit by way of the long switch-blade 48 has been opened, the normal energizing circuit for the motor remaining established by way of the short switch-blade 44 through the protecting fuse 37 in series. Furthermore, with the parts in this position (Fig. 3), the spring 57 has swung the link 55 on its pivot 56 to a position to bring the extremity of the short transverse portion of the slot 63 into engagement with the stud 62, thus locking the link 55 against downward movement from this position, downward pressure upon the link merely tending to force the end of slot 63 tighter against pin 62 in the relationship in which those parts are shown in Fig. 3, and consequently making it impossible to move the handle 53 downward and the long switch-blade 48 into engagement with the terminal jaw 24 from the position of the parts shown in Fig. 3; on the contrary, both switch-blades must be moved to their open position shown in Fig. 1 before the long switch-blade can again be operated to close its short or shunt circuit around the fuse. This is important for several reasons, for example, suppose the fuse has blown and an operative not altogether familiar with the mechanism is sent to replace the fuse, and is uncertain as to which way the handle 53 must be moved to open the switch to deaden the fuse terminals preparatory to inserting a new fuse. Taking a chance against his uncertainty, he might (if the mechanism permitted) swing the operating handle the wrong way, bringing the long switch-blade 48 into engagement with its terminal jaw and closing the circuit through the motor. Had the motor, for instance, been stalled through a defect in machinery which it is used to drive, the motor would likely be seriously injured before the operative could realize the conditions and open the circuit. But with the link 55 serving to lock the parts against a downward movement of the long switch-blade from the position shown in Fig. 3, the operative could only move the handle 53 upward to completely open the switch. Such movement of handle 53, followed by opening of the box and insertion of a new fuse, necessitates delay, deliberation and reflection on the part of the operator and reasonably assures discovery and rectification of the cause of the trouble before the handle is again operated to close the circuit. Many other illustrations of a similar nature might be given to emphasize the importance of this self-locking feature of the mechanism, serving to prevent anything but the correct movement of the parts and thus eliminating the possibility of much destruction of property which might otherwise result from unfamiliarity with such mechanisms or carelessness in the operation thereof.

Upward movement of handle 53 from the position shown in Fig. 3 causes the link 55 to pull upward on stud 62 and blade 44. When the engagement of the said blade and its jaw terminal 36 has thus been somewhat loosened and relative movement of the parts has brought stud 62 into the long part of slot 63, the spring 46 completes the upward movement of blade 44 and its disengagement from the terminal 36 with a snap-action, which is important in providing a quick-break arc-reducing switch.

Another object of the invention is the provision of means which preclude the opening of the cover with the switch closed, and which still further contribute to the safety of operators by making it impossible to close the switch with the cover open, or to close both switch and cover simultaneously. Such means are illustrated in Figs. 7–11; no attempt has been made to show the same in Figs. 1–6, because of confusion with the illustration of other parts of the mechanism that would result. In Figs. 7–10, the switch blades and other parts are purposely omitted, but the positions of such omitted parts will be readily understood from the position of the operating handle shown in Figs. 7–10 in dotted lines. An arm or interlocking member 80 depends on the inside of the cover into proximity to the switch shaft 52, and a side flange or lip 81 at the end of said arm is curved concentric to the axis of the shaft in the position of the parts shown in Fig. 7. Another interlocking member in the form of an arm or lever 82 is fixed on shaft 52 and has at its outer end an enlargement or head 83 having its edge curved concentric to the axis of the shaft and adapted in certain positions of the parts to stand over the lip 81, the members 80 and 82 thereby interlocking. A link 84 is pivoted at one end to a lug 85 on the inside of the cover and a slot in its other end is loosely engaged by a stud at the outer end of an arm 86 fixed to shaft 52.

In Fig. 7, the position of operating handle 53 corresponds to that shown in Fig. 3, with the long switch blade 48 open and short blade 44 closed, this being the normal running condition of the parts with the circuit closed through fuse 37. In this position the cover is closed and locked by the head 83 of arm 82 standing over and in the path of movement of lip 81 of arm 80, as shown in dotted lines Fig. 7. From this Fig. 7, it is apparent that the cover would be similarly locked in the position of the switch parts shown in Fig. 2. In Fig. 8, the switch is open as in Fig. 1, and the head or enlargement 83 has been moved out of the path of lip 81, so that there is no interlocking of members 80 and 82 to obstruct opening of the cover. In Fig. 9, both the switch and cover are fully opened, the stud on arm 86 engaging the outer end of the slot in link 84, whereby it becomes impossible to operate the handle 53 to close the switch without first closing the cover. Attempt to close the cover and switch simultaneously brings the lip 81 into contact with the head 83, as shown in Fig. 10, and hence the switch cannot be closed until after the cover has first been completely closed.

I have illustrated and described what I now regard as the preferred embodiment of my invention; but it is to be expressly understood that I do not restrict myself to that particular embodiment, the invention being capable of other embodiments, applications and uses without departing from the principle thereof. Furthermore, while the switching means of the invention are especially designed for use in combination with an electric fuse, as defined in some of the claims, I do not restrict myself to such use of the switching means in conjunction with a fuse.

What is claimed is:—

1. In an electric switch and fuse structure, the combination of an electric fuse, switching means operable to close a circuit connection around the fuse and to thereafter automatically establish a circuit connection through the fuse with said first-named connection open, and means preventing a succeeding operation of the switching means to close the circuit connection around the fuse until said connection through the fuse has been opened.

2. In an electric switch and fuse structure, the combination of an electric fuse, circuit terminals, switching means operable to connect the terminals around the fuse and to connect the terminals through the fuse in series with said first-named connection open, said means acting to effect such change of connections without current interruption, and means preventing a succeeding operation of the switching means to connect the terminals around the fuse until said connection through the fuse has been opened.

3. In an electric switch and fuse structure, the combination of an electric fuse, switching means operable to close a circuit connection around the fuse and also to close another circuit connection through the fuse in series with said first-named circuit connection open, said means acting to effect such change of connections without current interruption, and means preventing a succeeding operation of the switching means to reëstablish said circuit connection around the fuse until said circuit connection through the fuse has been opened.

4. In an electric switch and fuse structure, the combination of an electric fuse, circuit terminals, switching means operable to connect the terminals around the fuse and to connect the terminals through the fuse in series with said first-named connection open, said means acting to effect such change of connections without current interruption, and means preventing a succeeding operation of the switching means to connect the terminals around the fuse until said switching means have been operated to open said connection through the fuse.

5. In an electric switch and fuse structure, the combination of an electric fuse, circuit terminals, switching means operable to connect the terminals around the fuse and to thereupon automatically open said first-named connection leaving the terminals connected through the fuse in series, and means preventing a succeeding operation of the switching means to connect the terminals around the fuse until said switching means have been manually actuated to open said connection through the fuse.

6. In an electric switch, switching means operable to establish circuit connections by two paths at the same time and to then open one of said paths leaving the other intact, and means preventing a succeeding operation of the switching means to reëstablish said opened path until said closed path has been opened.

7. In an electric switch, circuit terminals, switching means operable to connect the terminals by two paths and then automatically operable to open one path leaving the other established, and means preventing a succeeding operation of the switching means to reëstablish said opened path until said switching means have been manually actuated to open said closed path.

8. In an electric switch, two circuit closing switch members, actuating means common to both members and operable to move the same to their closed position and to then move one member to its open position leaving the other closed, and means to prevent reclosing of the first-opened member until the other member has been moved to its open position.

9. In an electric switch, two circuit closing switch members, actuating means common to both members operable to close the same and to then successively open said members, and means to prevent reclosing of the first-opened member until the other member has been moved to its open position.

10. In an electric switch and fuse structure, the combination of an electric fuse, two switch members one adapted to close a circuit through the fuse and the other to close a shunt or short circuit around the fuse, actuating means common to both members operable to close the same and then open the shunt-circuit member leaving the other closed, and means to prevent reclosing of the first-opened member until the other member has been moved to its open position.

11. In an electric switch, two circuit closing switch members, actuating means common to said members and adapted first to close both members, second to open one leaving the other closed, and third to also open the other, and means preventing actuation of the members from the second to the first condition without passing through the third condition.

12. In an electric switch and fuse structure, the combination of an electric fuse, two circuit closing switch members one adapted to close a circuit through the fuse and the other to close a shunt or short-circuit around the fuse, actuating means common to said members and adapted first to close both members, second to open the shunt circuit member leaving the other closed, and third to also open the fuse-circuit member, and means preventing actuation of said members from the second to the first condition without passing through the third condition.

13. In an electric switch, two circuit closing switch members, manually operable means for actuating said switch-members, means adapted to automatically open one of said switch members after both members have been closed by the manual means, and means to prevent reclosing of the first-opened member until the other member has been moved to its open position.

14. In an electric switch, two circuit closing switch members, manually operable means including a handle for actuating said switch members, means adapted to automatically open one of said switch members upon release of the handle by the operator after both members have been closed, and means preventing reclosing of said automatically opened member without first opening the other closed member.

15. In an electric switch, two circuit closing switch members, manually operable means including a handle for actuating said switch members, spring means adapted to be put under tension when said manual means are actuated to close the switch members and to automatically open one of said switch members upon release of the handle by the operator, and means preventing reclosing of said automatically opened member without first opening the other closed member.

16. In an electric switch, two circuit closing switch members, manually operable means for actuating said switch members including a handle and a link having slot and stud connections with each of said members, and means adapted to automatically open one of said switch members after both members have been closed by the manual means and to thereby bring the studs and slots into interlocking relationship preventing reclosing of the automatically opened member without first opening the other closed member.

17. In an electric switch, two circuit closing switch members, manually operable means for actuating said switch members including a handle and a link having slot and stud connections with each of said members, and spring means adapted to be put under tension when said manual means are actuated to close the switch members and to automatically open one of said switch members after both members have been closed by the manual means and to thereby bring the studs and slots into interlocking relationship preventing reclosing of the automatically opened member without first opening the other closed member.

18. The combination of a two-part casing one of said parts being a cover; a switch in the casing including two movable switch members; means extending to the exterior of the casing to actuate said switch members; and a pivotal locking member associated with one casing part and actuated upon movement of the switch members to interlock with a part on the other casing part with both switch members closed and also with one switch member closed and the other open, thereby locking the cover closed in such positions of the switch members.

In testimony whereof I have signed this specification in the presence of two subscribing witnesses.

RALPH C. PATTON.

Witnesses:
P. O. BAKER,
GEORGE W. STEERE.